United States Patent
Kaler et al.

(10) Patent No.: US 7,454,486 B2
(45) Date of Patent: Nov. 18, 2008

(54) PROFILING AND TRACING DISTRIBUTED APPLICATIONS

(75) Inventors: Christopher G. Kaler, Sammamish, WA (US); Oliver J. Sharp, Seattle, WA (US); Erik B. Christensen, Seattle, WA (US); Dale A. Woodford, Bellevue, WA (US); David Erb, Seattle, WA (US); Ferhan Elvanoglu, Redmond, WA (US); Shaun D. Pierce, Sammamish, WA (US); Luis Felipe Cabrera, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 948 days.

(21) Appl. No.: 10/191,816

(22) Filed: Jul. 9, 2002

(65) Prior Publication Data

US 2004/0010570 A1 Jan. 15, 2004

(51) Int. Cl.
*G06F 15/173* (2006.01)
*G06F 15/16* (2006.01)
*G06F 9/44* (2006.01)

(52) U.S. Cl. .................. 709/223; 709/206; 717/130
(58) Field of Classification Search .................. 705/59; 713/167; 717/130, 158, 128; 719/315–317; 709/223–224
See application file for complete search history.

(56) References Cited

U.S. PATENT DOCUMENTS

2002/0138446 A1* 9/2002 Antonin et al. ............... 705/67
2002/0143819 A1* 10/2002 Han et al. .................... 707/513

FOREIGN PATENT DOCUMENTS

GB 2368689 A * 5/2002

OTHER PUBLICATIONS

Shende et al., Portable Profiling and Tracing for Parallel, Scientific Applications using C++: profile, Aug. 1998, ACM Sigmetrics Symposium on Parallel and Distributed Tools, pp. 134-145.*
Box et al., Simple Object Access Protocol (SOAP), May 8, 2000, W3C, Note 1.1, sections 1-2, 4.2, 4.2.1, , 4.2.2, , 4.2.3, 4.3 and 8.*

(Continued)

*Primary Examiner*—William C. Vaughn, Jr.
*Assistant Examiner*—Peling A Shaw
(74) *Attorney, Agent, or Firm*—Workman Nydegger

(57) ABSTRACT

Profile controls for profiling a distributed application are included in messages that are also used by the distributed application to transport data. A profile initiator causes profile controls to be inserted in the header portion of a message that is being transported across a distributed system. The profile initiator may insert profile controls directly or may cause a message router that receives the message to merge profile controls into the message. The message router may receive profile controls from the profile initiator or from computer-readable media that are maintained at the message router. The message, which now includes distributed application data and profile controls, is routed to a message recipient. The message recipient accesses the message to identify profile actions that are to be performed at the message recipient. The message recipient performs at least one of the identified profile actions.

20 Claims, 5 Drawing Sheets

OTHER PUBLICATIONS

Using XML to Specify a Trace Format for MPI Programs, S. Huband, and C. McDonald, Journal of Research and Practice on Information Technology, Publ. by Australian Comput. Soc., Australia, May 2001, vol. 33, No. 2, pp. 133-145.

An Integrated Simulation Environment for Parallel and Distributed System Prototyping A.D. George, R.B. Fogarty, J.S Markwell and M.D. Miars, Simulation, Publ. by Simulation Councils, USA, May 1999, vol. 72, No. 5, pp. 283-294.

Critical Path Profiling of Message Passing and Shared-Memory Programs, J.K. Hollingsworth, IEEE Transactions on Parallel and Distributed Systems, Publ. by IEEE, USA, Oct. 1998, vol. 9, No. 10, pp. 1029-1040.

Performance Analysis of MPI Programs, E. Karrels and E. Lusk, Proceedings of the Second Workshop on Environments and Tools for Parallel Scientific Computing, Publ. by SIAM, Philadelphia, PA, USA, 1994, pp. 195-200.

* cited by examiner

PROFILING AND TRACING DISTRIBUTED APPLICATIONS

BACKGROUND OF THE INVENTION

1. The Field of the Invention

The present invention relates to tracing and profiling distributed applications. More specifically, the present invention relates to systems, methods, and computer-program products for including tracing and/or profiling information along with distributed application data in messages that are utilized by distributed applications during normal operation.

2. Background and Relevant Art

Computer systems and related technology affect many aspects of society. Indeed, the computer system's ability to process information has transformed the way we live and work. Computer systems now commonly perform a host of tasks (e.g. information management, scheduling, and word processing) that prior to the advent of the computer system were typically performed manually. More recently, computer systems have been coupled to one another to form computer networks over which computer systems may transfer data electronically.

Initially, a significant portion of data transfer on computer networks was performed using specific applications (e.g. electronic mail applications) to transfer data files from one computer system to another computer. For example, a first user at a first networked computer system could electronically mail a word processing document to a second user at a second networked computer system. However, program execution (e.g. running the electronic mail application) and data access (e.g. attaching the word processing document to an electronic mail message) were essentially completely performed at single computer system (e.g. the first computer system). That is, a computer system would execute programs and access data from storage locations contained in the computer system. Thus, being coupled to a network would not inherently give one networked computer system the ability to access data from another networked computer system. Only after a user actively sends data to a computer system could the computer system access the data.

However more recently, as the availability of higher-speed networks has increased, many computer networks have shifted towards a distributed architecture. Such networks are frequently referred to as distributed systems. Distributed systems function to "distribute" program execution and data access across the modules of a number of different computer systems coupled to a network.

In a distributed system, modules connected to a common network interoperate and communicate between one another in a manner that may be transparent to a user. For example, a user of a client computer system may select an application program icon from a user-interface thereby causing an application program stored at a server computer system to execute. The user-interface may indicate to the user that the application program has executed, but the user may be unaware, and in fact may not care, that the application program was executed at the server computer system. The client computer system and the server computer system may communicate in the background to transfer the user's commands, program responses, and data between the client computer system and the server computer system.

Often, a distributed system includes a substantial number of client computer systems and server computer systems. In many cases, computer systems of a distributed system may function both as client computer systems and server computer systems, providing data and resources to some computer systems and receiving data and resources from other computer systems. Each computer system of a distributed system may include a different configuration of hardware and software modules. For example, computer systems may have different types and quantities of processors, different operating systems, different application programs, and different peripherals. Additionally, the communications path between computer systems of a distributed system may include a number of networking components, such as, for example, firewalls, routers, proxies and gateways. Each networking component may include one or more software or hardware modules that condition and/or format portions of data so as to make them accessible to other modules in the distributed system.

In some cases, "distributed applications" are specifically designed for execution in a distributed system. Since many distributed systems include a substantial number of modules, the design and configuration of distributed applications is significantly more complex than designing and configuring applications for execution at a single computer system. Each portion of a distributed application, in addition to being configured for proper operation in a stand-alone mode, must also be configured to appropriately communicate with other portions of the distributed application, as well as other modules in associated distributed systems. Due to this complexity, communication between portions of distributed applications (even those that are properly configured) may operate in an undesirable manner from time to time. As such, it is often desirable to gather information from intermediary modules of a distributed system that facilitate communication between portions of a distributed application. Gathering such information is frequently referred to as "tracing" or "profiling" (hereinafter referred to jointly as "profiling").

One common profiling technique used on distributed systems is to attach, or "glue on," a profiling process to a portion of distributed application and monitor communication to and from the portion of the distributed application. As communication occurs, the profiling process records communication data to a log file. In some cases, profiling processes are attached to a number of different portions of a distributed application and each profiling process records data to a separate log file. The separate log files are then pulled together and correlated to give some indication of what may be causing undesirable communication between portions of a distributed application.

Attached profiling processes offer little control over profiling functions that are performed and the amount of data that is returned when communication to and from a portion of a distributed application is being profiled. These processes may have standardized profiling operations with limited ability to configure the operations for specific distributed systems. This may result in too much data, some of which may not even be useful for profiling a particular portion of a distributed application, being returned by profiling processes. Lack of control over the amount of data that is returned may result in a "probe effect," where the amount of data returned is so great that performance of a distributed system is impacted.

Some profiling mechanisms require specialized profiling code to operate. Specialized code may cause a distributed application to report information from different modules of a distributed system back to a profiler. Thus, a profiler may have a better indication of what is causing undesirable behavior. However, the use of specialized profiling code has at least one inherent problem: specialized profiling code is often self-contained and will not interact with other profiling programs. Since specialized profiling code is often incompatible with other profiling programs, different versions specialized profiling code must be individually developed for different distributed applications. This is time consuming and may require substantially technical expertise on the part of a programmer.

Another difficulty in using specialized profiling code is a decreased ability to profile timing interactions between different portions of a distributed application. Only in a deployed system can the vast majority of timing interdependencies be profiled. In most profiling mechanisms that utilize specialized profiling code it is not practical to profile all possible timing combinations that may occur.

Further, modules of a distributed system are often protected by security mechanisms, such as, for example, firewalls that block some types of communication. That is, security mechanisms may be configured so that communications between portions of a distributed application are allowed, but other communications that may be seen as a security risk are blocked by the security mechanisms. Since profiling operations may interact with modules in ways that could be destructive, security mechanisms frequently interpret requests to profile a portion of a distributed application as potentially harmful communications and thus block the communications.

Therefore, what are desired are systems, methods, and computer program products, for more efficiently and accurately profiling distributed applications.

BRIEF SUMMARY OF THE INVENTION

The principles of the present invention provide for profiling and/or tracing (hereinafter referred to jointly as "profiling") distributed applications by including tracing and profiling controls (hereinafter referred to jointly as "profile controls") and tracing and profiling data (hereinafter referred to jointly as "profile data") along with distributed application data in messages that are utilized by distributed applications during normal operation. The principles of the present invention may be practiced in a distributed system environment that includes a number of message processors (e.g. computer systems, routers, gateways, etc.), each of which may perform message operations (e.g. initiating, accessing, modifying or routing a message) on messages that are transported across the distributed system.

In one example embodiment, a message that originated at a message initiator (e.g. a client computer system) is accessed. Such a message may be a message that includes distributed application data for a distributed application that is currently running on a distributed system. Accessing a message may include accessing data included in the body portion and/or header portion of a message, such as, for example, specific header blocks and/or specific body blocks of a Simple Object Access Protocol ("SOAP") envelope. In some cases, a "profile initiator," which may also be a message processor, accesses the message.

Profile controls, that will cause one or more message recipients (e.g. other message processors) to perform profiling actions indicated by the profile controls, are inserted into the message. The performance of profiling actions may cause profiling data to be inserted into the message. In some cases, a profile initiator may receive the message and subsequently insert profile controls into the message. In other cases, a profile initiator may send a first message to a message router thereby causing the message router to insert the profile controls into a second message that is received at the message router.

In one example embodiment, profile controls are inserted into messages that are transported using SOAP. A "profile" header may be defined, which includes one or more profile control attributes. A message processor (e.g. a profile initiator) may cause a profile header with the appropriate attributes to be included in a message or may modify existing profile headers. Any number of profile attributes may be inserted into a message, as many or as few as are appropriate for profiling a particular distributed application. Thus, a user attempting to profile a distributed application may have flexible control over the profiling functions that will be performed and the amount of data that is returned.

A profile condition attribute may represent a condition that causes a profile action to be contingent on the occurrence of an event, for example, that a message processor is experiencing specified load conditions or that a message has traveled a specified number of "hops." If the event occurs, the condition is satisfied and the performance of a profile action may result. If the event does not occur, the condition is not satisfied and the performance of profile action does not result.

A profile action attribute represents an action that is performed at a message processor to cause the message processor to perform an action, such as, for example, inserting profile data into a message or creating a new message containing profile data. For example, a message processor may be caused to record a Message ID or a timestamp to a message.

A profile data attribute represents profile data that is to be returned to a specified message processor (e.g. a profile initiator).

The message, which now includes profile controls, is routed to a destination message recipient designated in the message. This may include routing a message to a message processor that is to perform a profiling action indicating by the inserted profile controls. Thus, profile controls may "flow" to the message processor that is to perform a profile action and/or insert profile data into the message.

In some embodiments, a first message is received at a message router (which may be a message processor). The first message may include distributed application data associated with a distributed application that is currently operating in the distributed system. The current message router receives profile controls that will cause one or more message recipients (e.g. other message processors) to record profile data indicated by the profile controls. Profile controls may be included in a second message (e.g. a SOAP message) that is received from a profile initiator. Likewise, computer-readable media containing profile controls may be maintained at the message router. When a processed message matches specified attach conditions, the message router may attach profile controls received from the computer-readable media or that were included in the second message.

The message router merges profile controls into the first message. The message router may insert profile controls into a header portion of the first message. This may take the form of inserting profile controls into an existing profile header or inserting a new profile header that contains profile controls. Merging profile controls into existing messages (e.g. those including distributed application data) allows profile controls to be expressed without changing a distributed application. The first message is routed to a destination message recipient designated in the message.

The routed message, which includes distributed application data and profile controls, is then received at a current message recipient. The current message recipient accesses the message to identify profile controls that may potentially cause the message recipient to perform a profile action. Performing a profile action can include the current message recipient processing profile attributes, such as, for example, profile condition attributes. If processed profile condition attributes so indicate, a profile action, such as, for example, recording profile data to the message, may result. Recording profile data to a message can include inserting a profile data attribute into the message or appending profile data to an existing profile data attribute. The message is then routed to a destination message recipient designated in the message. This may include routing a message to another message processor that is to perform profile actions indicated in the message or routing the message to a profile initiator.

By including profile controls in messages that are already in use by distributed applications, profiling is essentially "built into" an existing messaging infrastructure. Since profile controls may be included in messages that are protocol independent, such as, for example, SOAP envelopes, profile controls may pass through firewalls and/or other security mechanisms. Further, since there is increased control over the amount of data that is returned when profiling a distributed application, the probe effect may be reduced.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
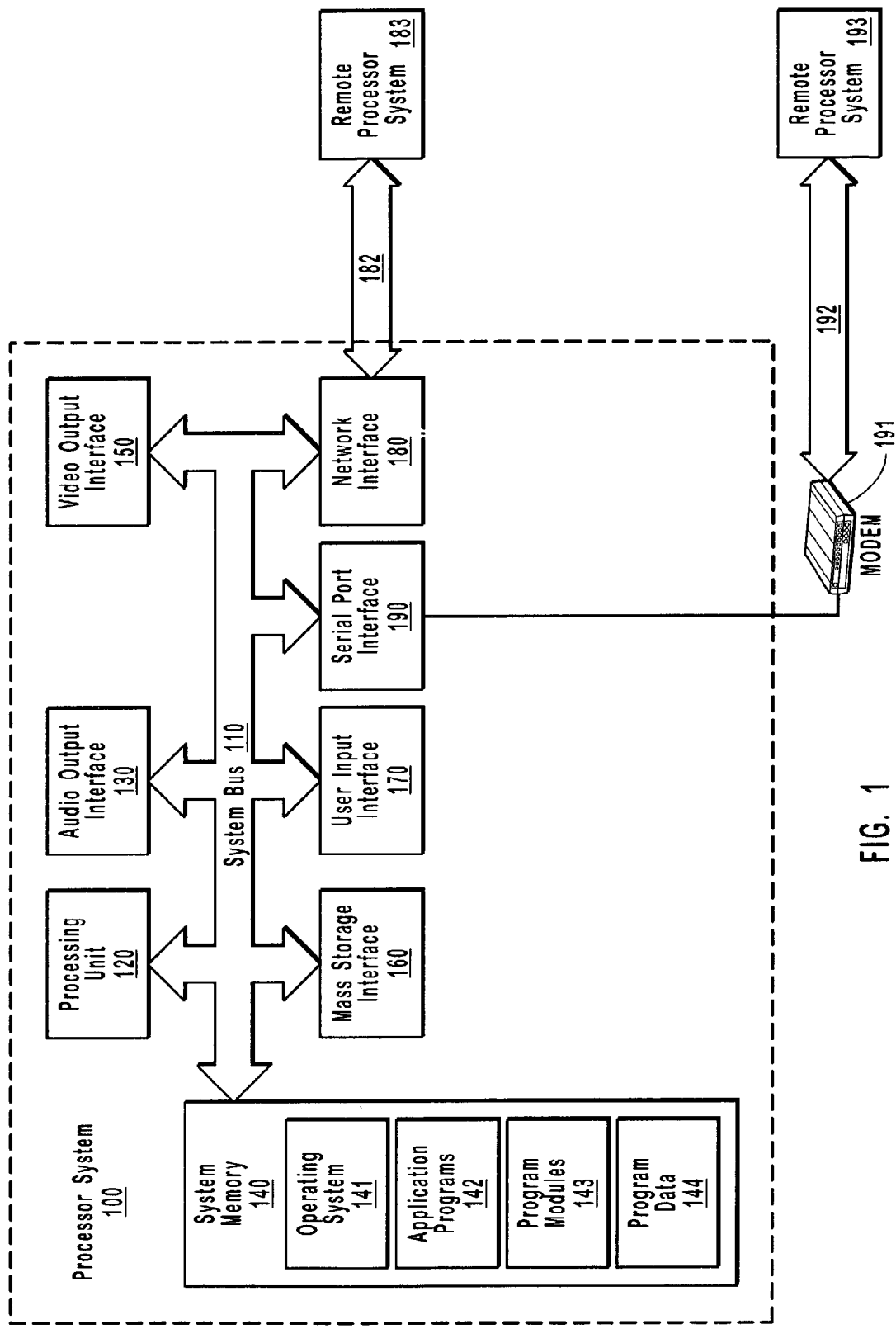
FIG. 1 illustrates an example of a processor system that provides a suitable operating environment for the present invention.

The present invention extends to systems, methods, and computer program products for profiling and/or tracing (hereinafter referred to jointly as "profiling") distributed applications by including profiling and tracing controls (hereinafter referred to jointly as "profile controls") and profiling and tracing data (hereinafter referred to jointly as "profile data") along with distributed application data in messages that are utilized by distributed applications during normal operation. Messages associated with distributed applications may be transported between the message processors of a distributed system. A first message processor may insert profile controls into a current message. The profile controls, when processed by a second message processor, may cause the second message processor to perform one or more profile actions. Performance of a profile action may cause profile data to be inserted into the current message and/or into one or more other messages.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, which is accessible by a general-purpose or special-purpose computer system.

By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as any architecture where two or more computer systems may exchange data with each other. When information is transferred or provided over a network or another communications connection (either hardwired, wireless, or a combination of hardwired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

In this description and in the following claims, a "computer system" is defined as one or more software modules, one or more hardware modules, or combinations thereof that work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including routers, gateways, firewalls, proxies, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired links, wireless links, or by a combination of hardwired or wireless links) through a communication network, both perform tasks. In a distributed system environment, program modules may be located in both local and remote memory storage devices.

In this description and in the following claims, a "message processor" is defined as one or more modules (hardware and/or software) that operate together to perform one or more messaging operations on messages that are transported in a distributed system. Messaging operations may include, for example, initiating a message, accessing a message, appending information to a message, sending a message, receiving a message, routing a message, removing information from a message, and terminating a message. Each message processor in a distributed system may include the functionality to perform any of the messaging operations.

In this description and in the following claims, a message processor may be referred to by a particular messaging operation, such as, for example, "initiating", "receiving", and so forth, that is performed at the message processor. When such references are made, a descriptive term representing the particular messaging operation may be substituted for the word "processor", such as, for example, message "router," message "recipient," message "initiator", and so forth, when describing the message processor. This is for descriptive purposes only so as to help distinguish between multiple message processors that may be acting together in a given context. However, this is not meant to imply that a message processor is limited to only the referenced messaging operation used to describe the message processor.

Initiating a message may include generating data for the body and/or header portion of a message. Accessing a message may include processing data included in the body and/or header portion of a message. Appending data to a message may include inserting and/or merging data into the body and/or header portion of a message.

Routing a message includes sending, receiving, and/or determining where to send a message. For example, a message router may "route" a message from a sending message processor to a receiving message processor. The message router may receive the message from the sending message processor, access addressing information from the header portion of the message, and subsequently send the message to the receiving message processor. A message router may also route a message to itself. That is, a message router may determine that a message should be sent to the message router.

It should be understood that when a message is transferred between message processors, the actual physical path traveled by the message might dynamically change due to conditions of a distributed system. For example, when a first portion of a distributed system is experiencing increased latency, a message may be "re-routed" through a second different portion of the distributed system. Further, when a series of messages are routed to a message processor, each message may take a different route.

Removing data from a message includes removing data from the body and/or header portion of a message. Terminating a message includes removing the message from the distributed system.

In this description and in the following claims, reference may be made to a "profile initiator." It should be understood that a profile initiator is a message processor and may include the functionality to perform any messaging operations. A profile initiator causes profile actions to be performed in the distributed system.

In this description and in the following claims, reference may be made to a "profile logger." It should be understood that a profile logger is a message processor and may include the functionality to perform any messaging operations. A profile logger maintains profile data that is generated as a result of profile actions being performed. Messages containing profile data may be sent to a profile logger that stores the profile data for later use.

In this description and in the following claims, a "profiling agent" is defined as a module that processes profile controls and may be included in a message processor. For example, a profiling agent may identify if certain profile conditions are met, perform associated profile actions, and insert profile data into a message.

In this description and in the following claims, a "logical communication link" is defined as any communication link that enables the transport of electronic data between two message processors. The actual physical representation of a communication path between two entities is not important and may change over time. A logical communication link may include portions of a system bus, a local area network, a wide area network, the Internet, combinations thereof, or portions of any other paths that facilitates the transport of electronic data. Logical communication links can include hardwired links, wireless links, or a combination of hardwired links and wireless links. In the description of the figures that follow, a logical communication link is represented by an arrow or a solid line. It should be understood that a logical communication link could include any number of message processors, such as, for example, proxies, routers, firewalls, gateways, or computer systems. However to simplify the description, these message processors may not be shown. Logical communication links may also include portions of a Virtual Private Network ("VPN").

FIG. 1 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing steps of the methods disclosed herein. The particular sequences of such executable instructions or associated data structures represent examples of corresponding acts for implementing the functions described in such steps.

With reference to FIG. 1, a suitable operating environment for the principles of the invention includes a general-purpose computer system in the form of a processor system 100. Processor system 100 may be a message processor that has been adapted to perform the operations disclosed herein.

Processor system 100 includes a user input interface 170 that receives information from an input device, such as, for example, a keyboard, microphone, or mouse. An input device can be coupled to user input interface 170 so as to enable the entry of information. An input device may transfer information over such a coupling in response to preprogrammed data or user manipulation of the input device.

Processor system 100 includes a video output interface 150 that provides a video output signal to external video display devices. Processor system 100 may be integrally positioned with or separate from a video display device, such as, for example, a color or monochrome computer monitor. A video display device can be coupled to video output interface 150 so as to receive a provided video output signal.

Similarly, processor system 100 includes an audio output interface 130 that provides an audio output signal to external audio output devices. Processor system 100 may also be integrally positioned with or separate from an audio system, which may include a speaker or other device capable of emitting sound data. An audio system can be coupled to audio output interface 130 so as to receive a provided audio output signal.

Processor system 100 includes processing unit 120, which allows for complex and flexible general-purpose processing capabilities. Processing unit 120 executes computer-executable instructions designed to implement features of processor system 100, including features of the present invention. Processing unit 120 is coupled to system bus 110, which also interconnects various other system components, including system memory 140.

System memory 140 generally represents a wide variety of volatile and/or non-volatile memories and may include types of memory previously discussed. However, the particular type of memory used in processor system 100 is not important to the present invention. Program code means comprising one or more program modules may be stored in system memory 140. The one or more program modules may include an operating system 141, one or more application programs 142, other program modules 143, and program data 144.

Processor system 100 may include mass storage interface 160, which can read data from and/or write data to a mass storage device, such as, for example, a magnetic disk storage device or optical disk storage device. A mass storage device can be coupled to mass storage interface 160 so as to enable the reading and writing of data. When a mass storage device is coupled to mass storage interface 160, one or more program modules including operating system 141, application programs 142, other program modules 143, and program data 144 may be stored in the mass storage device.

Processor system 100 may be network connectable to networks, such as, for example, an office-wide or enterprise-wide computer network, an intranet and/or the Internet. Processor system 100 may exchange data with external sources, such as, for example, remote processor systems and/or databases over such a network.

Processor system 100 includes network interface 180, through which processor system 100 receives data from external sources and/or transmits data to external sources. As illustrated in FIG. 1, network interface 180 facilitates the exchange of data with remote processor system 183 via logical communication link 182. Logical communication link 182 represents a portion of a network, and remote processor system 183 represents a node of the network.

Likewise, processor system 100 includes serial port interface 190, through which processor system 100 receives data from external sources and/or transmits data to external sources. Serial port interface 190 is coupled to modem 191, which converts data appropriately between serial port interface and logical communication link 192. As illustrated in FIG. 1, serial port interface 190 and modem 191 facilitate the exchange of data with remote processor 193 via logical communication link 192. Logical communication link 192 represents a portion of a network, and remote processor system 193 represents a node of the network.

Alternatively, the exchange of data with external sources may be facilitated by other interfaces, such as, for example, a parallel port, a game port or a universal serial bus ("USB").

It should be understood that the illustrated network connections are merely examples. It would be apparent to one skilled in the art, after having reviewed this description, that a wide variety of network connection techniques may be used to facilitate the exchange of data between processor system 100 and external sources.

While FIG. 1 represents a suitable operating environment for the present invention, the principles of the present invention may be employed in any system that is capable of, with suitable modification if necessary, implementing the principles of the present invention. The environment illustrated in FIG. 1 is illustrative only and by no means represents even a small portion of the wide variety of environments in which the principles of the present invention may be implemented.

In accordance with the present invention, message processor modules and profiling agents as well as associated data, including profile controls and profile data, may be stored and accessed from any of the computer-readable media associated with processor systems 100. For example, portions of such modules and portions of associated program data may be included in operating system 141, application programs 142, program modules 143 and/or program data 144, for storage in system memory 140. If a mass storage device is coupled to processor system 100, such modules and associated program data may also be stored in the mass storage device.

In a networked environment, program modules depicted relative to processor system 100, or portions thereof, can be stored in remote memory storage devices, such as, for example, system memory and/or mass storage devices associated with remote processor 183 and/or remote processor 193. Execution of such modules may be performed in a distributed environment as previously described.

Figure 2:
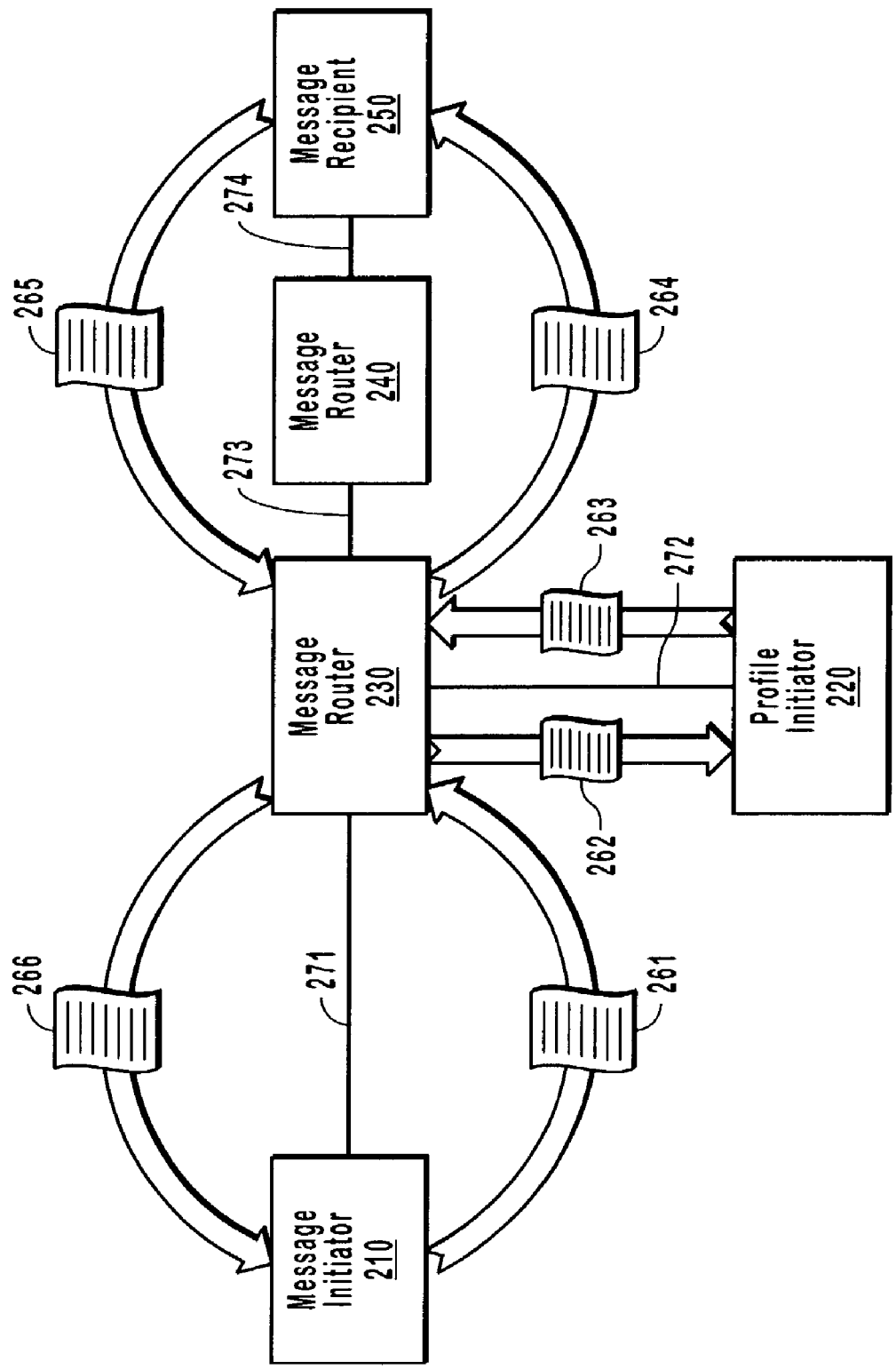
FIG. 2 illustrates an example of some of the functional components that facilitate profiling a distributed application by including profile controls in messages.

FIG. 2 illustrates some of the functional components that can facilitate profiling a distributed application by including profile controls along with distributed application data in messages. FIG. 2 includes message initiator 210, profile initiator 220, message router 230, message router 240, and message recipient 250, which are each message processors. FIG. 2 also includes messages 261 through 266 that can be passed between the illustrated message processors over logical communication links 271 through 274.

A message can include a header portion and a body portion. The body portion of a message may contain actual distributed data that is being transported between different portions of a distributed application. The header portion of a message may include one or more header blocks containing control information. Control information designates how data in the body portion of a message should be processed. Control information can be used to designate, for example, that the body portion of a message is encrypted, that the body portion of a message is subject to specified security policies, or that a message should be routed in a specified manner. When a message processor receives a message, the message processor may determine what operations it should perform on the message based on the control information. For example, when a message processor is the ultimate message recipient of the body portion of a message, the message processor may decrypt the data in the body portion of the message. However, when a message processor is merely an intermediary, the message processor may simply route the message to an appropriate destination.

Figure 3:
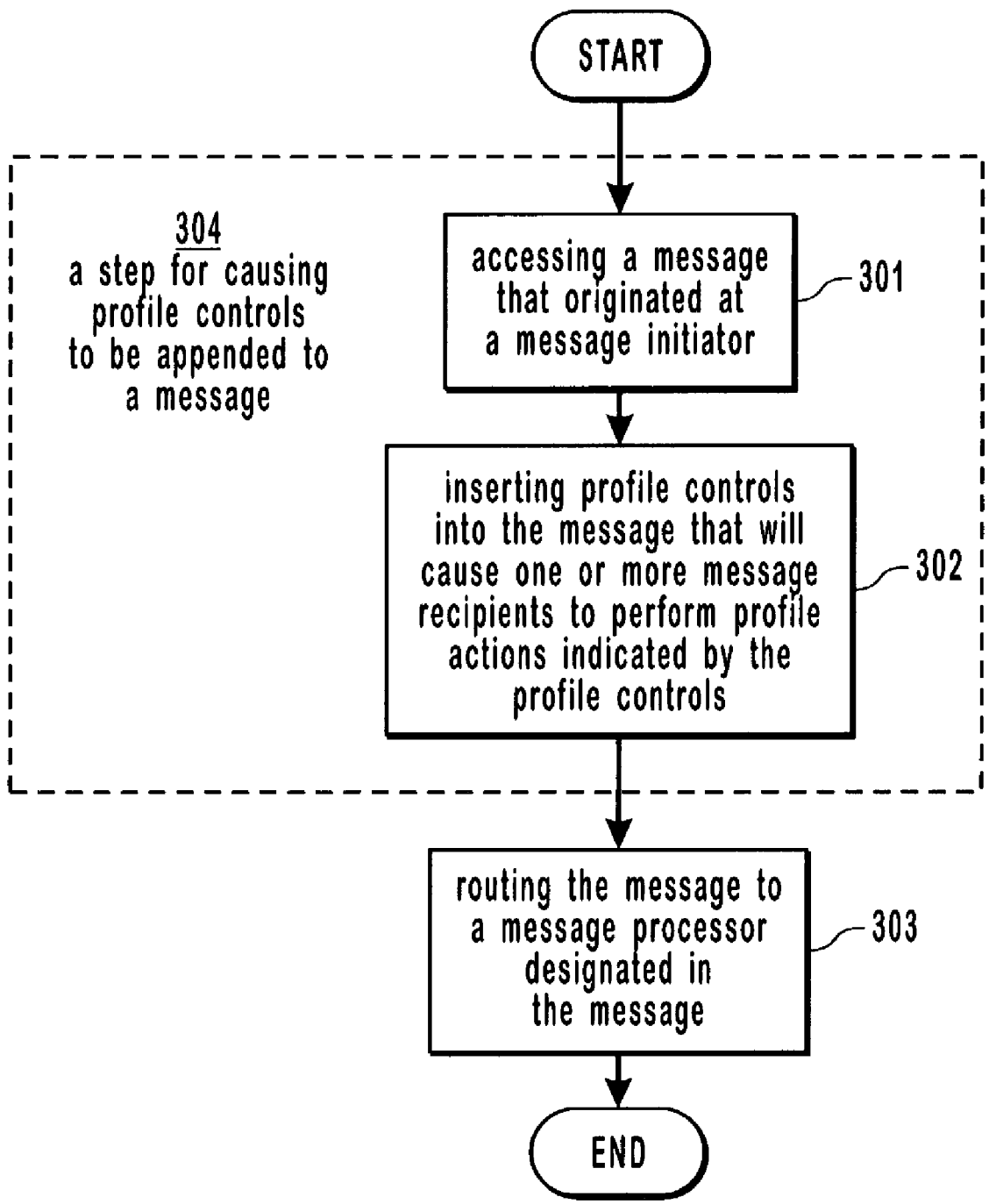
FIG. 3 is a flow diagram illustrating an example of a method for causing profile controls to be inserted into a message.

FIG. 3 is a flow diagram illustrating an example of a method for causing profile controls to be inserted into a message. The method of FIG. 3 will be discussed with reference to the functional components of FIG. 2.

The method in FIG. 3 begins with a functional, result-oriented step for causing profile controls to be appended to a message (step 304). Step 304 may be performed so as to include the profile controls along with distributed application data in the message. Step 304 may include any corresponding acts for accomplishing the result of causing profile controls to be appended to a message. However, in the illustrated example of FIG. 3, the step 304 includes a corresponding act of accessing a message that originated at a message initiator (act 301). Referring to FIG. 2, message initiator 210 initiates message 261 and then routes message 261 to message router 230 via logical communication link 271. Message 261 may be initiated when a portion of a distributed application running at message initiator 210 attempts to communicate with a portion of the distributed application running at another message processor (e.g. message recipient 250).

Profile initiator 220 may access message 261 when it is at message router 230. In that case, profile initiator 220 sends message 263 to message router 230 to gain access to message 261. Message 263 may include instructions on how message router 230 should process message 261. Message router 230 may follow the instructions included in message 263 to access data included in the body portion and/or the header portion of message 261.

Step 304 includes a corresponding act of inserting profile controls into a message that will cause one or more message recipients to perform profile actions indicated by the profile controls (act 302). In addition to causing message router 230 to access message 261, the instructions included in message 263 may also cause message router 230 to insert profile controls into message 261. Profile controls can be inserted into a message without affecting distributed application controls and/or data contained in the message and may take the form of control information that is included in the header portion of a message. Profile controls may be contained in a "profile" header that is inserted into message 261.

It should be understood that the present invention is not limited to messaging using any specific transport protocol and format. However, one example protocol that may be used to implement the principles of the present invention is called Simple Object Access Protocol ("SOAP"). The following is an example structure in which profile controls are included in a unique "<Profile>" header within SOAP envelope:

```
1.   <Envelope>
2.      <Header>
         .
         .
         .
3.         <Profile>
4.            PROFILE CONTROLS
5.         </Profile>
         .
         .
         .
6.      </Header>
7.      <Body>
8.            DISTRIBUTED APPLICATION DATA
9.      </Body>
10.  </Envelope>
```

In this example, the profile controls may include one or more free-form eXtensible Markup Language ("XML") documents. While using the profile header in the header portion of a SOAP envelope allows for the profile controls to be transported in HyperText Transport Protocol ("HTTP") in this example, the profile portion of a message may be provided using other mechanisms as well. There is no requirement that the profile portion of a message be implemented in the context of a SOAP envelope, or that profile controls include an XML document. Profile controls can include computer-executable instructions, computer-readable instructions, and/or scripts, such as, for example, Java applets, Java scripts, and/or Java derived language statements that are embedded in a message. Invoking embedded instructions, applets, or scripts can cause profile actions to be performed. Profile controls may be included in messages that are transported using Remote Method Invocation ("RMI") protocols, that are transferred in a Common Object Request Broker Architecture ("CORBA") environment, or that are transferred in a Common Language Runtime ("CLR") environment.

In one illustrative example, profile controls include profile conditions and profile actions. If profile controls are included in XML documents, this may take the form of profile condition attributes and profile action attributes being associated with a <Profile> header.

A profile condition attribute may represent a condition that causes a profile action to be contingent on the occurrence of an event. A profile condition can be any logical condition a message processor can evaluate, including but not limited to an address of an originating or destination message processor, the number of "hops" a message has taken, and/or the state of the message processor, such as, for example, experiencing specified load conditions. If the event occurs, the condition is satisfied and a profile action may result. If the event does not occur, the condition is not satisfied and a profile action does not result.

A profile action attribute represents an action that is performed at a message processor to cause the message processor to insert profile data into a message, such as, for example, load characteristics of a computer system or process, memory usage, time stamps, or Message IDs. Profile data can be inserted back into the same message that caused a profile action to be performed. For example, profile data can be inserted into a message containing a profile action attribute, that when processed at a message processor, caused the message processor to perform a profile action. The message, including the inserted profile data, can then be transported to a profile initiator and/or profile logger. However, profile data can also be transported to a profile initiator and/or profile logger out-of-band. That is, profile data can be inserted into a message other than the message that caused the profile action to be performed. This other message can then be transported to a profile initiator and/or profile logger.

It should be understood that the described profile conditions and profile actions are illustrative only. It would be apparent to one skilled in the art, after having reviewed this description, that a wide variety of profile conditions may be used to cause a profile action to be contingent on the occurrence of an event when implementing the principles of the present invention. Further, it would be apparent to one skilled in the art, after having reviewed this description, that a wide variety of profile actions may be used when implementing the principles of the present invention.

In some embodiments, a profiling agent contained in message router 230 monitors messages that are received and/or initiated at message router 230. In response to certain attach conditions (e.g. receiving message 263), the profiling agent causes profile controls to be inserted into message 261. Attach conditions may include, for example, that it be a specified time of day or day of the week, that a message processor associated with the profiling agent be experiencing specified load conditions, that the profiling agent receive a message that has taken a specified number of hops, or that a message matches a specific pattern.

In other embodiments, the profiling agent enables profile initiator 220 to intercept the message 261. For example, the profiling agent may modify routing information included in the header portion of message 261 to cause message 262 to be sent to profile initiator 220 via logical communication link 272. In that case, message 262 may be essentially identical to message 261. Profile initiator 220 then accesses message 262 and inserts profile controls into message 262. Profile initiator 220 may also modify routing information to route distributed application data contained in message 261 to its original destination. Profile initiator 220 then sends message 263, which now includes the profile controls, to message router 230 via logical communication link 272.

The message 263, which has the same distributed application data in the body portion as message 261 had, is then routed to its originally designated destination message recipient (act 303). This can include routing a message to a message processor that is to perform a profile action indicated by the inserted profile controls. Thus, profile controls may "flow" with distributed application data to the message processor where a profile action is to be performed.

In FIG. 2, this may include message router 230 routing message 264 to message recipient 250. Message 264 may include distributed application data that was contained in message 261 along with profile controls that were caused to be inserted by profile initiator 220. Message 264 may be routed from message router 230 to message router 240 via logical communication link 273 and then from message router 240 to message recipient 250 via logical communication link 274.

In some cases, inserted profile controls, such as, for example, the profile controls inserted in act 302, can cause a message to be routed differently. For example, profile controls inserted into a message at message router 230 may cause the message, which was previously being routed to message router 240, to instead be routed to message recipient 250. Message router 230 may detect that certain profile controls are inserted into the message and appropriately modify addressing information in the header portion of the message to cause the message to be routed to message recipient 250.

Figure 4:
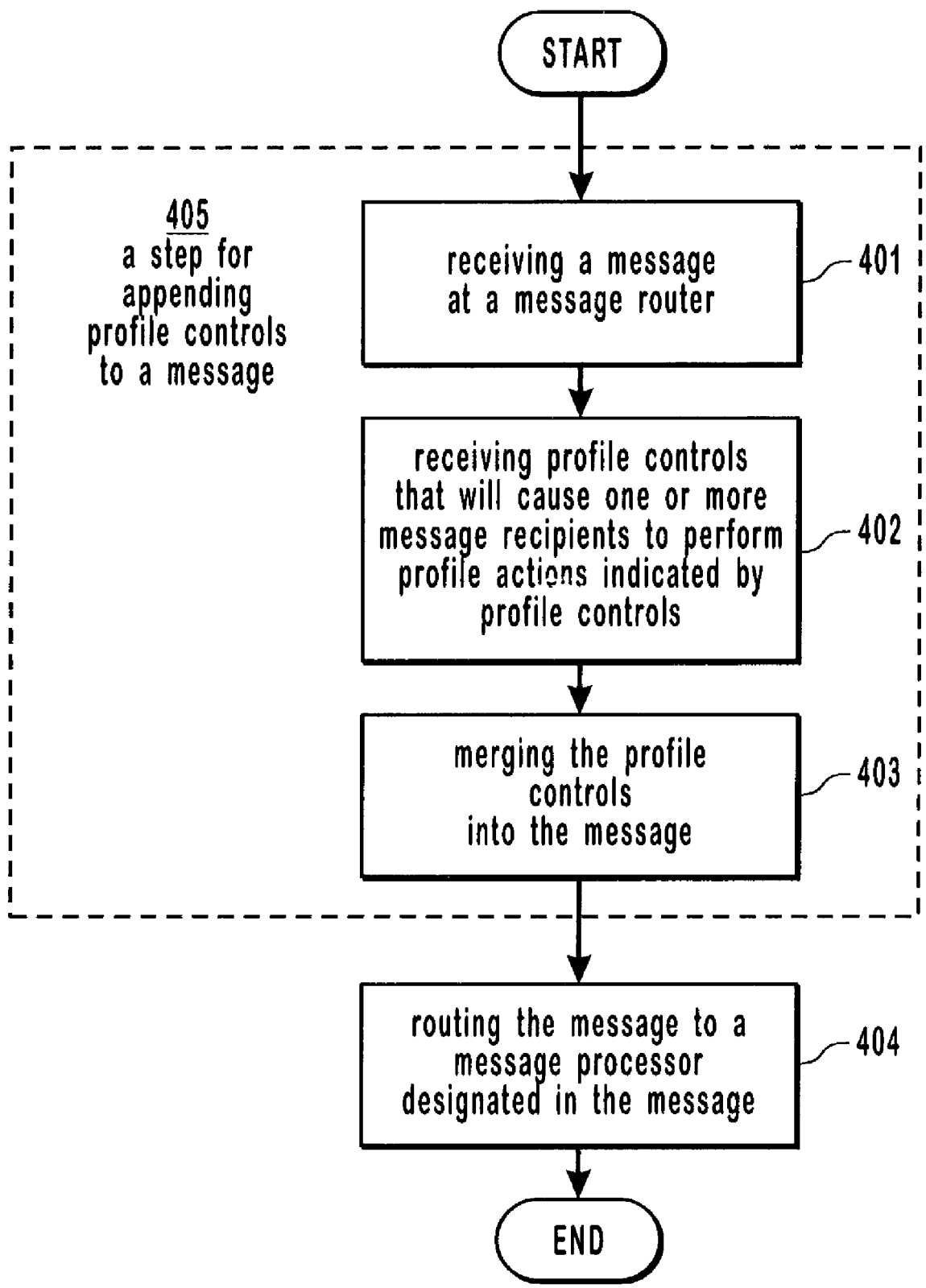
FIG. 4 is a flow diagram illustrating an example of a method for merging profile controls into a message.

FIG. 4 is a flow diagram illustrating an example of a method for inserting profile controls into a message. The method of FIG. 4 will be discussed with reference to the functional components of FIG. 2.

The method in FIG. 4 begins with a functional, result-oriented step for appending profile controls to a message (step 405). Step 405 may be performed so as to include the profile controls along with distributed application data in the message. Step 405 may include any corresponding acts for accomplishing the result of causing profile controls to be appended to a message. However, in the illustrated example of FIG. 4, the step 405 includes a corresponding act of receiving a message at a message router (act 401). This can include message router 230 receiving message 261.

Step 405 includes a corresponding act of receiving profile controls that will cause one or more message recipients to perform profile actions indicated by the profile controls (act 402). This can include profile initiator 220 initiating message 263, inserting profile controls into message 263, and then sending message 263 to message router 230 via logical communication link 272.

In one example embodiment, computer-readable media containing profile controls are maintained at a message processor. When a processed message matches specified "attach" conditions, profile controls are received from the computer-readable media. For example, message router 230 may maintain computer-readable media containing profile controls. When message 261 is received at message router 230, message router 230 analyzes the circumstances surrounding the reception of message 261 (e.g. current network conditions, time of day, address of a sending message processor, etc.) as well as the characteristics of message 261 (e.g. size, contents, header information, etc.). If specified conditions are satisfied (e.g. load conditions are above/below a specified threshold, message 261 is of a specified size, timing conditions are satisfied, etc.) message router 230 receives profile controls from the maintained computer-readable media.

Specified conditions can include specified security requirements. For example, a message processor may need to be "authorized" to insert profile controls into a message. In embodiments that use SOAP envelopes, message processors that are authorized to insert profile controls may have a special license or a license with specific rights expressed. A message processor attaches the license to a SOAP envelope and digitally signs any inserted profile controls to indicate that the message processor is authorized to insert the profile controls. Other message processors that receive the SOAP envelope process the digital signature to determine that the inserted profile controls are authorized profile controls. Different licenses or rights can be assigned to different message processors. More secure message processors, such as, for example, those on an intranet, can be given more rights than less secure processors, such as, for example, those on an extranet or the Internet.

Alternately, message 263 includes instructions, such as, for example, XML documents, that cause message router 230 to receive profile controls from computer-readable media maintained at message router 230. Instructions can be express instructions that cause message router 230 to receive profile controls from computer-readable media irrespective of any attach conditions.

Step 405 includes a corresponding act of merging the profile controls into the message (act 403). When a message that includes profile controls is received from a profile initiator, a message router can access the profile controls included in the message. For example, message router 230 can access profile controls that were inserted into message 263 by profile initiator 220. Message router 230 "propagates" the profile controls from message 263 to message 261. That is, message router 230 extracts the profile controls from message 263 and appends the profile controls to message 261. When appending profile controls to a message, message router 230 can merge profile controls into an existing profile header of a message or can merge a new profile header into a message. Likewise, message router 230 can merge profile controls that were received from computer-readable media. Merging profile controls into existing messages (e.g. those already including distributed application data) allows profile controls to be expressed without affecting operation of a distributed application.

The message is routed to a message processor designated in the message (act 404). This can include routing a message to a message processor that is to perform a profile action indicated by the inserted profile controls.

Figure 5:
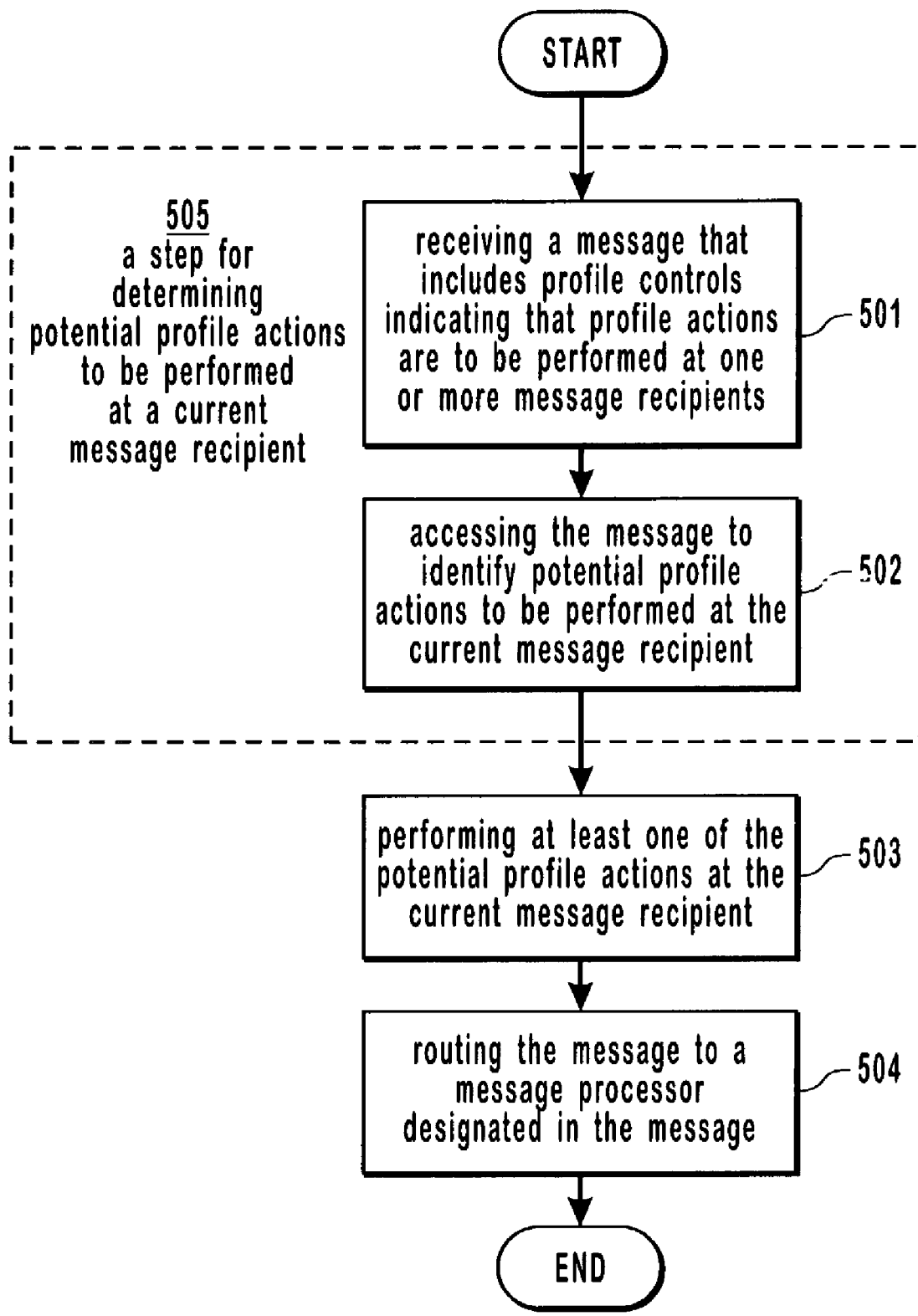
FIG. 5 is a flow diagram illustrating an example of a method for performing a profile action to cause profile data to be inserted into a message.

FIG. 5 is a flow diagram illustrating an example of a method for performing a profile action at a message processor. The method of FIG. 5 will be discussed with reference to the functional components of FIG. 2.

The method in FIG. 5 begins with a functional, result-oriented step for determining potential profile actions to be performed at a current message recipient (step 505). Step 505 may include any corresponding acts for determining potential profile actions that are to be performed. However, in the illustrated example of FIG. 5, step 505 includes a corresponding act of receiving a message that includes profile controls indicating profile actions are to be performed at one or more message recipients (act 501).

This includes message recipient 250 receiving message 264. Message 264 may be a message that includes distributed application data along with profile controls indicating profile actions that are to be performed on the distributed application data included in message 264.

Step 505 includes a corresponding act of accessing the message to identify potential profile actions to be performed at the current message recipient (act 502). For example, message recipient 250 can access message 264 to identify profile actions to be performed at message recipient 250. This includes identifying profile controls that are associated with message recipient 250. In some cases, a profiling agent contained in a message processor processes profile headers contained in a message. For example, a profiling agent contained in message recipient 250 can process profile condition attributes to identify profile actions associated with message recipient 250. Message recipient 250 can also verify security requirements, such as, for example, digital signatures, to determine that inserted profile controls are authorized profile controls. A message processor or profiling agent may invoke instructions, applets, or scripts to cause profile controls to be identified.

Step 505 includes a corresponding act of performing at least one of the potential profile actions at the current message recipient (act 503). Performing a profile action may include message recipient 250 performing any of the profile actions previously described. It should be understood that previously described profile actions are merely examples. It would be apparent to one skilled in the art, after having reviewed this description, that a wide variety of profile actions, in addition to those previously described, may be performed when implementing the principles of the present invention.

Performing a profile action can cause profile data to be inserted into the message. Similarly to profile controls, profile data can be included in a SOAP envelope. The following is an example structure in which profile data is included in the "<Profile>" header within SOAP envelope:

```
1.   <Envelope>
2.      <Header>
         .
         .
         .
3.         <Profile>
4.            PROFILE DATA
5.         </Profile>
         .
         .
         .
6.      </Header>
7.      <Body>
8.            DISTRIBUTED APPLICATION DATA
9.      </Body>
10.  </Envelope>
```

In this example, the profile data may include one or more free-form XML documents. However, similar to profile controls, profile data is not limited to this implementation. If profile controls are included in XML documents, this may take the form of profile data attributes being associated with a <Profile> header. A profile data attribute represents profile data that is to be returned to a specified message processor (e.g. a profile initiator or profile logger). It should be understood that profile controls and profile data may both be included in a single <Profile> header.

The message is routed to a message processor designated in the message (act 504). It may be that message 264 includes profile controls for profile actions that are to be performed at other message recipients in addition to message recipient 264. As such, message 264 is routed to one of these additional message recipients.

However, it may also be that a message is routed back to a profile initiator. Message recipient 250 may initiate message 265 and then route message 265 to message router 230. Message 265 may be initiated when a portion of a distributed application running at message recipient 250 attempts to communicate with a portion of the distributed application running at message initiator 210. Message 265 can include distributed application data that is to be returned to message initiator 210, as well as profile data resulting from any profile actions that were performed at message recipient 250. Message router 230 causes profile data to be routed to profile initiator 220. Profile data can be included in message 262 and sent from message router 230 to profile initiator 220 via logical communication link 272. Message router 230 causes distributed application data to be routed to message initiator 210. Distributed application data can be included in message 266 and sent from message router 230 to message initiator 210 via logical communication link 210.

Likewise, it may also be that a message containing profile data is routed to a profile logger. For example, after receiving message 265, message router 230 may cause profile data to be routed to a profile logger (not shown) and distributed application data to be routed to message initiator 210.

In some embodiments, profile data may be returned to a profile initiator or profile logger in a message that does not contain distributed application data. For example, after message recipient 250 performs a profile action, profile data can be inserted into a different and/or newly initiated message, other than the message that was received in act 501 (e.g. message 264). A different message may be any other message that has been routed to message recipient 250. A newly initiated message may be a message that was initiated at message recipient 250, or initiated at another message processor (e.g. message router 240) and routed to message recipient 250, for the purpose of containing profile data resulting from the performance of a profile action. Messages that contain profile data but that do not contain distributed application data can be routed to a profile initiator or profile logger in a manner similar to messages that contain both profile data and distributed application data. In fact, a message processor, such as, for example, message router 230 may cause some profiling data to be routed to profile initiator 220 and other profiling data to be routed to a profile logger.

In some embodiments, profile data associated with performed profile actions can be used as input to profiling agents maintained at message processors to configure profile controls that will be inserted/merged into messages. Thus, in some cases, distributed applications are profiled in a "closed loop" environment where output from previous profile actions is used as input to configure future profile controls.

In some embodiments, a message containing profile controls is associated with a "message-flow-ID" that represents a particular distributed application. As the message passes between message processors, each message processor is aware of the distributed application associated with the message. In other embodiments, a distributed application may utilize an Application Program Interface ("API"), or other similar mechanism, to indicate which message it is processing. In either embodiment, the underlying system can automatically track the flow of a message. For managed code applications, a virtual machine can track the context of a profile action to determine message flow. For native code, a message can be associated with per-thread storage.

In some embodiments, a distributed application is profiled across a plurality of distrusting but cooperative message processors. Different portions of a distributed application can be managed by different entities, such as, for example, different individuals or corporations. Each entity may cooperate with other entities during execution of the distributed application. For example, a user may initiate a purchase order application on the Website of a book selling entity. The purchase order application may draw money from a banking entity and use a shipping entity for delivery of a purchased book. Thus, the user, the book selling entity, the banking entity, and the shipping entity all cooperate during execution of the purchase order application.

However, for profiling purposes each of these entities may not trust one another. For example, it may be undesirable to allow the user to profile portions of the purchase order application that are managed by the book selling entity and undesirable to allow the book selling entity to profile portions of the purchase order application that are managed by the banking entity. Express rules can be established to control the profile controls an entity can attach to a message. Thus, the express rules can be used to restrict entities from profile portions of the purchase order application they do not manage.

In some embodiments, a trusted entity is trusted by all other entities to profile all the portions of a distributed application. For example, the user, the book selling entity, the banking entity, and the shipping entity may all trust a profiling entity that is authorized to profile all portions of the purchase order application. Each of the other entities can give the profiling entity authorization to attach profiling information to messages that are processed by portions of the purchase order application that they manage. Different express rules can be established to control what applications a profiling entity can profile and when (e.g. day, time) they can profile the applications.

No central authority is required to manage the express rules. Each individual entity controls a "Web of Trust" that includes trusted entities, what applications the trusted entities can access, and what operations trusted entities can perform on these applications. That is, each entity individual grants profiling authorization to other entities without interfacing to a central authority. Since no central authority is required, an individual entity can more easily update a Web of Trust as the processing and administrative needs of the entity change.

By including profile controls in messages that are already in use by distributed applications, profiling is essentially "built into" an existing messaging infrastructure. Since profile controls may be included in messages that are protocol independent, such as, for example, SOAP envelopes, profile controls may pass through firewalls and/or other security mechanisms. Further, since there is increased control over the amount of data that is returned when profiling a distributed application, the probe effect may be reduced.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a distributed system, the distributed system comprising a plurality of modules of a distributed application, each module connected to a common network and at least one message router, and the plurality of modules distributing the execution of the distributed application across a plurality of different computer systems, a method for profiling the distributed application by configuring profile actions that are to be performed at a message recipient, the method comprising the following:
   an act of the message router receiving a first message from a module of the distributed application and intended for receipt by another module of the distributed application, the first message comprising distributed application data for the distributed application running on the distributed system;
   an act of the message router receiving profile controls, the profile controls including control information comprising executable instructions, which, when received by a message recipient, will cause the message recipient to perform profile actions indicated by the profile controls;
   an act of the message router modifying the first message by merging the profile controls including the executable instructions into the first message; and
   an act of the message router routing the modified first message to a destination message recipient designated in the first message, causing the destination message recipient to record profile data as indicated by the inserted profile controls.

2. The method as recited in claim 1, wherein the act of receiving a first message at the message router comprises the following:
   an act of receiving a Simple Object Access Protocol envelope.

3. The method as recited in claim 1, wherein the act of receiving a first message at the message router comprises the following:
   an act of receiving a message that was transported using a Remote Method Invocation protocol.

4. The method as recited in claim 1, wherein the act of receiving profile controls comprises the following:
   an act of receiving a second message that includes profile controls.

5. The method as recited in claim 1, wherein the act of receiving profile controls comprises the following:
   an act of receiving a second message including instructions that represent profile controls that are to be received.

6. The method as recited in claim 1, wherein the act of receiving profile controls comprises the following:
   an act of receiving profile controls from one or more computer-readable media associated with the message router.

7. The method as recited in claim 1, wherein the act of receiving profile controls comprises the following:
   an act of receiving a profile header.

8. The method as recited in claim 1, wherein the act of receiving profile controls comprises the following:
   an act of a profiling agent receiving profile controls as a result of an attach condition being satisfied.

9. The method as recited in claim 8, wherein the act of a profiling agent receiving profile controls as a result of an attach condition being satisfied comprises the following:
   an act of a profiling agent receiving profile controls as a result of executed instructions determining that an attach condition is satisfied.

10. The method as recited in claim 1, wherein the act of receiving profile controls comprises the following:
    an act of a receiving profile controls that were authorized by a license agreement.

11. The method as recited in claim 1, wherein the act of receiving profile controls comprises the following:

an act of a receiving debug controls at a first entity that is trusted to profile a second entity.

12. The method as recited in claim 1, wherein the act of merging the profile controls into the first message comprises the following:

an act of propagating profile controls from a second message into the first message.

13. The method as recited in claim 1, wherein the act of merging the profile controls into the first message comprises the following:

an act of merging profile controls from one or more computer-readable media associated with the message router into the first message.

14. The method as recited in claim 1, wherein the act of merging the profile controls into the first message comprises the following:

an act of merging a profile header into the first message.

15. The method as recited in claim 1, wherein the act of merging the profile controls into the first message comprises the following:

an act of merging a profile condition into the first message.

16. The method as recited in claim 1, wherein the act of merging the profile controls into the first message comprises the following:

an act of a profile action into the first message.

17. The method as recited in claim 1, wherein the act of merging the profile controls into the first message comprises the following:

an act of a profiling agent merging profile controls into the first message as a result of an attach condition being satisfied.

18. The method as recited in claim 1, wherein the act of merging the profile controls into the first message comprises the following:

an act of a merging profile controls that were authorized by a license agreement.

19. The method as recited in claim 1, wherein the act of merging the profile controls into the first message comprises the following:

an act of a trusted entity merging profile controls that will profile a portion of a distributed application that is not managed by the trusted entity.

20. A computer program product for use in a distributed system, the distributed system comprising modules of a distributed application, each module connected to a common network and at least one message router and the plurality of modules distributing the execution of the distributed application across a plurality of different computer systems, the computer program product for implementing a method for profiling the distributed application by configuring profiling actions that are to be performed at a message recipient, the computer program product comprising:

one or more computer-readable storage media carrying computer-executable instructions, that when executed at the message router, cause the message router to perform the method of claim 1.

* * * * *